No. 701,553. Patented June 3, 1902.
Q. N. EVANS.
AIR MOISTENING APPARATUS.
(Application filed Apr. 18, 1901.)
(No Model.) 2 Sheets—Sheet 1.

WITNESSES:

INVENTOR:
Quimby N. Evans,
By Attorneys,

No. 701,553. Patented June 3, 1902.
Q. N. EVANS.
AIR MOISTENING APPARATUS.
(Application filed Apr. 18, 1901.)
(No Model.) 2 Sheets—Sheet 2.

WITNESSES:
Fred White
Domingo N. Llama

INVENTOR:
Quimby N. Evans,
By Attorneys,
Arthur C. Fraser & Co

UNITED STATES PATENT OFFICE.

QUIMBY N. EVANS, OF BROOKLYN, NEW YORK.

AIR-MOISTENING APPARATUS.

SPECIFICATION forming part of Letters Patent No. 701,553, dated June 3, 1902.

Application filed April 18, 1901. Serial No. 56,393. (No model.)

*To all whom it may concern:*

Be it known that I, QUIMBY N. EVANS, a citizen of the United States, residing in the borough of Brooklyn, county of Kings, in the city and State of New York, have invented certain new and useful Improvements in Air-Moistening Apparatus, of which the following is a specification.

My invention aims to provide an improved air-moistening apparatus for use in supplying moisture to the atmosphere of cotton-mills, factories, and the like and wherever it is desirable to artificially moisten the atmosphere.

By means of my invention it is possible to moisten to a desired degree a much greater volume of air than with the apparatus previously in use, at a slight cost for power, the water which supplies the moisture being utilized also to distribute it.

My invention provides, also, an improved apparatus of the kind specified, which is not liable to get out of order, which is very easily taken apart, cleaned, and reassembled.

My invention provides, also, an apparatus of the kind specified which utilizes with greatest efficiency the power by which it is driven.

My invention provides, also, various other improvements in details and in operation, as will be hereinafter specified.

Figure 1:
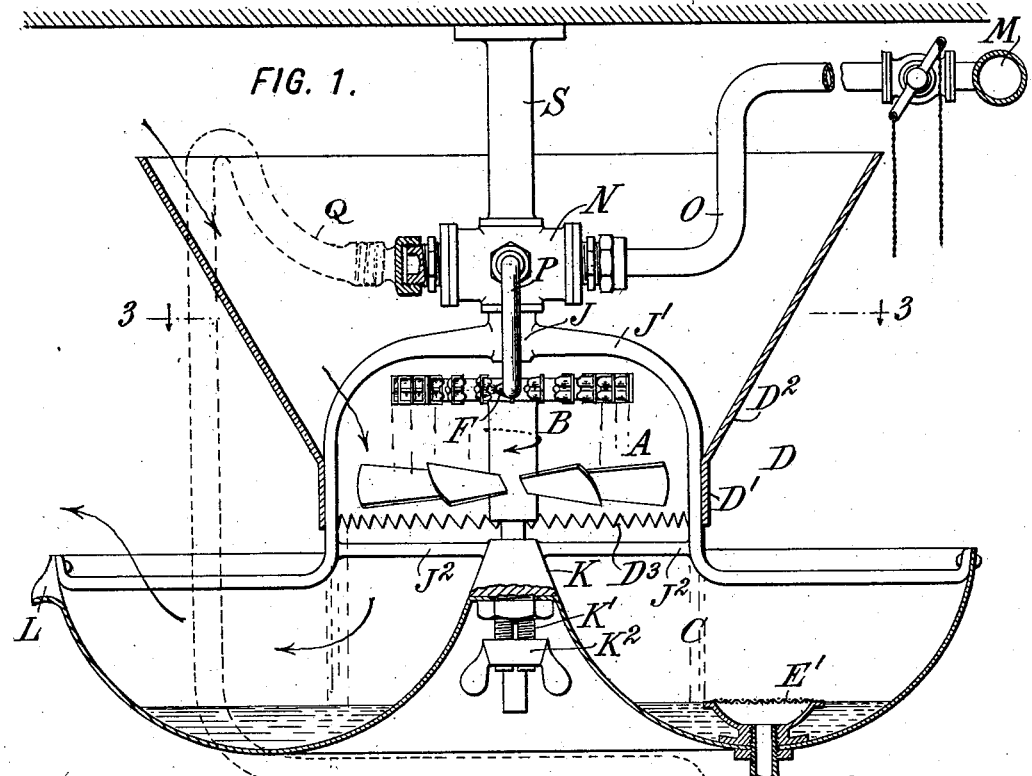
Figure 2:
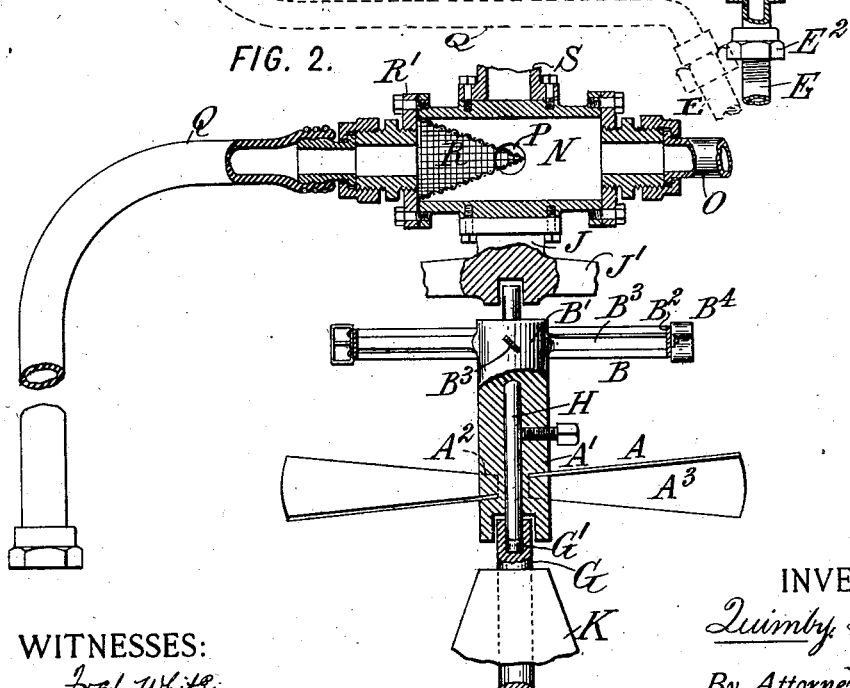
Figure 3:
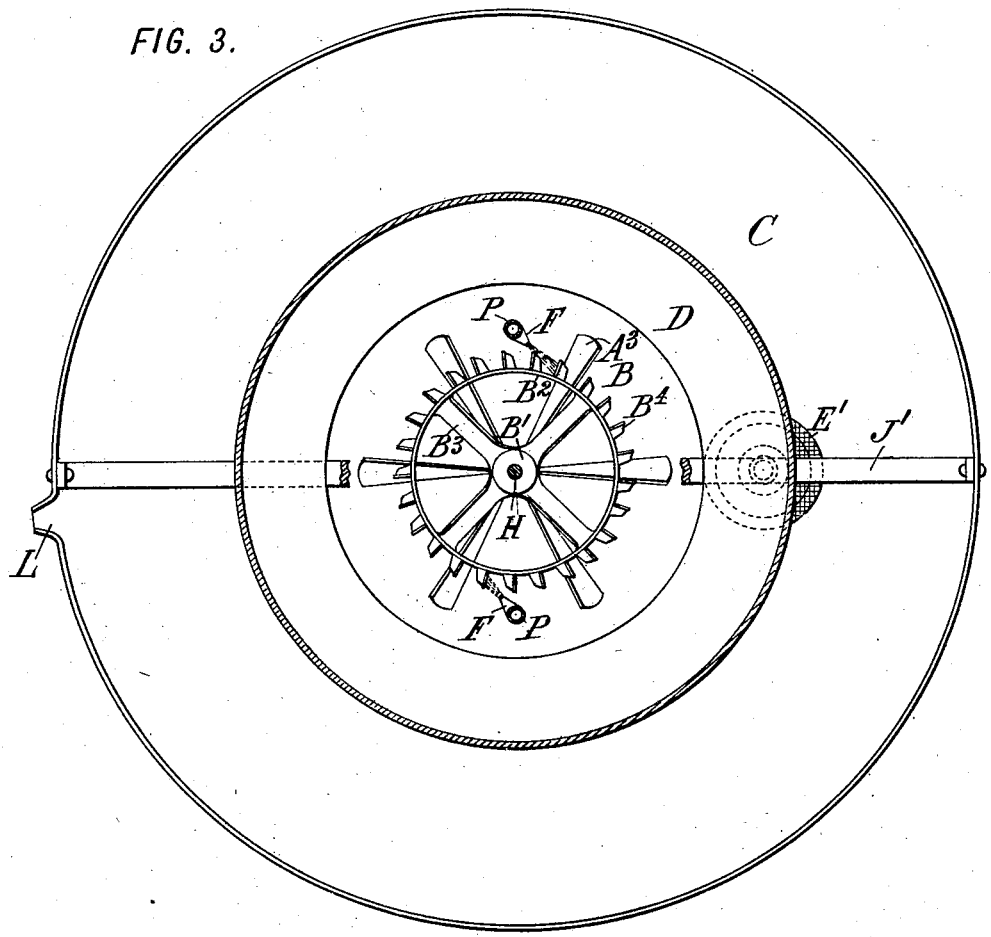
Figure 4:
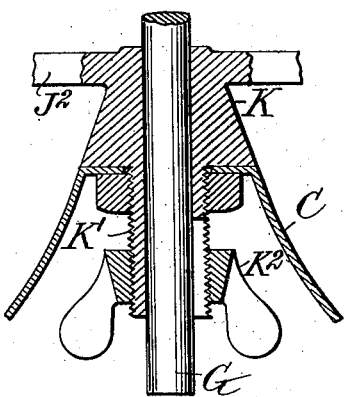

Referring to the accompanying drawings, showing one embodiment of my invention, Figure 1 is a vertical section showing the interior parts in elevation. Fig. 2 is a sectional view of certain of the parts shown in elevation in Fig. 1. Fig. 3 is a horizontal section approximately on the line 3 3 of Fig. 1, certain parts being omitted for the sake of clearness. Fig. 4 is a section of a detail enlarged.

According to the principal feature of my invention I distribute the moisture into the surrounding atmosphere by means of a fan, the water which supplies the moisture being also utilized to drive such fan by any suitable type of water-wheel. Preferably a basin is provided which receives the discharge from the water-wheel and retains always a supply of water, and the fan is arranged to pass a current of air over the supply of water in the basin, so as to take up moisture therefrom. Preferably, also, the water-wheel is above the fan and discharges partly through the fan, so that the fan reduces part of the discharge to spray. The inlet for the fan is arranged in the highest part of the room in which the apparatus is to operate, so as to take the hottest air, which absorbs the greatest quantity of water. Besides the moisture which the air absorbs by passing over the surface of the water in the basin, I preferably arrange a tubular casing around the fan and water-wheel, down whose walls water from the water-wheel is discharged, the current of air passing the lower edge of the tubular casing and through the rain, which is constantly falling from such lower edge. In the preferred construction of the parts of the most complete form of my apparatus the basin is supported from the ceiling and in turn supports the fan or equivalent mechanism for passing a current of air over the water in the basin, and the tubular casing above referred to is carried by the same supporting members as the basin. I prefer also to arrange a water-distributing fitting upon the main support, which carries the basin. An important feature also of my invention is the provision of means for connecting a flushing-pipe to the discharge-pipe from the basin, so as to flush, and thereby clean, the discharge-pipe when the latter becomes clogged or coated, by reason of dirt, lint, and the like or sediment in the water passing into the discharge-pipe.

Referring now to the drawings, A is a fan arranged to draw a current of dry hot air from near the ceiling, to pass such current through a space in which it may take up moisture, and finally to expel the same into the surrounding atmosphere, all as shown by the arrows in Fig. 1, where by reason of its weight it falls. It is then reheated and dried by the operations going on in the factory or room and reascends to the ceiling, whereby a continuous current is maintained. The moisture to be taken up by the current of air is obtained from a water-wheel B, which is also arranged to drive the fan A, preferably by being directly attached to or made integral with the hub of such fan. The fan is preferably arranged to blow downward, and below the same is a basin C, which catches the water discharged from the wheel B and retains a suitable quantity of the water, so that the current of air from the fan may take up moisture as it passes over the same. Preferably, also, the wheel B is arranged above the fan A, so that part of the water discharged from the wheel is struck by the revolving fan-blades and finely divided, which action assists materially in moistening the passing current of air. Preferably, also, the fan and water-wheel are surrounded by a casing D, which extends nearly to the ceiling to draw in the hottest air, as explained, and which receives part of the discharge from the wheel, the latter running down the wall of the casing and dripping from its lower horizontal edge as a sort of rain, through which the current of air must pass, thus again supplying moisture to such current. The height of the lower edge of the tubular casing above the basin C and the distance to which the outer edge of the basin extends beyond the lower edge of the casing D are such that no drops of water are blown bodily outside of the basin, a matter which might do considerable damage to machinery below. For determining the level of the water in the basin C an overflow-pipe E is provided, extending to the desired height within the basin and provided at its inlet end with a screen $E'$. A union or other detachable connection $E^2$ is provided near the upper end of the discharge-pipe for a purpose hereinafter referred to, which connects the portion fixed to the basin to the lower portion arranged in any suitable way to carry off the surplus water.

It is an economy to use only so much water as is necessary for supplying the desired quantity of moisture. This is, however, not entirely possible; but the quantity of water should be kept as low as possible, both for the sake of economy and because the water usually obtainable being full of sediment, lint, and dirt causes serious clogging and coating of the pipes. It is peculiarly advantageous, therefore, in this class of apparatus to use an impulse water-wheel, such as the Pelton wheel B shown, since this type of wheel gives the greatest efficiency under the circumstances most desirable in this case—namely, with a small quantity of water at a high pressure. For driving this wheel I prefer to use a pair of jet-nozzles F, substantially opposite to each other, so that the water which drips through the blades of the fan and that which is thrown against the tubular casing D will be substantially evenly distributed all around and also for the purpose of reducing the friction in the bearings of the wheel by balancing the driving force of it. In order to reduce to as low a point as possible the obstructive effect of the water-wheel on the column of air passing through the apparatus, I construct the same of a hub $B'$, a rim $B^2$, and spokes $B^3$, the latter being inclined transversely in cross-section in a direction to assist the fan by acting themselves as fan-blades, Fig. 2. The rim $B^2$, spokes $B^3$, and hub $B'$ are preferably cast in a single piece, which is also cast integral with the hub $A'$ of the fan. The buckets $B^4$ may be bolted directly on the rim $B^2$. The hub $A'$ of the fan is preferably cast with oblique slots $A^2$, in which the fan-blades $A^3$ are soldered, and is hollowed out on its under side, so as to surround the supporting member G.

The hub $A'$ $B'$ of the wheel and fan is set in any suitable manner on a shaft H, whose upper end is guided in a casting J, hereinafter described, and whose lower end has a bearing upon an agate or other suitable block $G'$ in the upper recessed end of the bearing-post G, Fig. 2. By this construction the bearing is well protected against the admission of water. The bearing-post G is carried by a block K, which also carries the basin C, Fig. 4. For most conveniently effecting this purpose the basin C is made in the annular trough shape shown, the central high point being under the block K, to which the trough is attached, the latter being conveniently made of spun zinc. The block K has a depending bushing $K'$, which surrounds the bearing-post G and which is split and exteriorly screw-threaded. A nut $K^2$ serves to clamp the post G, and consequently the fan and wheel, in their proper position and to transmit their weight directly to the block K.

Any suitable means may be employed for supporting the basin. I preferably provide a casting comprising a hub J, adapted to be attached to a support above and having a pair of arms $J'$ attached at their outer ends to the outer edge of the basin. The basin preferably is attached outside of the arms, as shown, so as to prevent water running off the ends of the arms outside the basin. Preferably the basin is also provided with an overflow L at one point of its circumference, which will of course be arranged in such position that it can do no damage to anything below in case the pipe E becomes clogged and the basin fills. Arms $J^2$ may be used to connect the block K directly with the arms $J'$.

A convenient means for supplying the water from the overhead main M is to pass it through a special fitting N, which I have designed for this purpose, Fig. 2. This fitting has openings for the attachment of an inlet-pipe O and one or more driving-pipes P, leading to the nozzles F, and in addition an opening for the attachment of a flushing-pipe Q, which may consist of a hose or other flexible tube adapted for attachment at one end to the fitting N and at the other end to the discharge-pipe E, as shown in dotted lines in Fig. 1, after the latter has been separated by means of the union $E^2$ from the basin. Preferably, also, a strainer R is arranged within the fitting N for insuring the use of clean water in flushing out the pipe E. For this purpose the head $R'$ may be made detachable, so that the screen may be cleaned whenever necessary. The driving-pipes P may also be provided with screens, if desirable. The fitting N for distributing the water is preferably carried by the main support S in the manner shown, whereby the main support carries the water-distributing fitting, the basin, and the fan and fan-driving mechanism.

The tubular casing D is preferably made with its lower portion D' cylindrical and closely surrounding the fan, while its upper portion D² is conical to provide a large inlet for air and to prevent splashing, as explained. The lower edge D³ may be toothed, as shown, in order to more evenly distribute the water which runs down it.

The operation of my improved apparatus is thought to be sufficiently indicated in the foregoing description.

It will be seen that I provide an apparatus which utilizes most efficiently the small quantity of water which it is advisable to use and generates a current of air passing through an atmosphere filled with spray caused by the rotation of the fan through the discharging-stream from the wheel, which passes also through a rain of water from the lower edges of the tubular casing, and which passes also over the surface of a body of water in the basin; that it is adapted to draw the hottest air from the room, which therefore takes up the greatest amount of moisture, and that it projects the air downward, which is the direction of natural flow of the moistening air, so that a rapid action is obtained; that it is simple in construction, easily assembled and disassembled for cleaning or repair, and that the various details are designed to coöperate with each other in obtaining the maximum efficiency and convenience in operation.

It is obvious that various modifications of the particular embodiment of my invention described can be designed by those skilled in the art and that various features may be omitted or altered without affecting the value of the other features. It will be understood that I do not limit myself to any one or all of the forms shown and described, but include within my invention all apparatus embodying substantially the principles of operation and construction referred to.

What I claim, and desire to secure by Letters Patent, are the following defined novel features and combinations:

1. The combination of a tubular casing having a substantially horizontal toothed lower edge, means for causing water to run down the wall of such casing, and a fan arranged to pass a current of air across such lower edge.

2. The combination of a fan, and a water-wheel arranged to drive said fan, said wheel having spokes inclined in a direction to assist said fan.

3. The combination in an air-moistening apparatus adapted to be driven by water-power and having a discharge-pipe, of a fitting having openings for an inlet-pipe, a driving-pipe and a flushing-pipe, and a detachable flushing-pipe adapted to be attached at opposite ends to said fitting and said discharge-pipe to clean the latter.

In witness whereof I have hereunto signed my name in the presence of two subscribing witnesses.

QUIMBY N. EVANS.

Witnesses:
ARTHUR C. FRASER,
FRED WHITE.